(12) United States Patent  
Baig

(10) Patent No.: US 9,459,117 B2  
(45) Date of Patent: Oct. 4, 2016

(54) INTERACTIVE USER INTERFACE PROVIDING WEATHER INFORMATION AND AVAILABLE TRIPS

(71) Applicant: Google Inc., Mountain View, CA (US)

(72) Inventor: Haroon Baig, Canton of Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/136,587

(22) Filed: Dec. 20, 2013

(65) Prior Publication Data

US 2015/0177019 A1  Jun. 25, 2015

(51) Int. Cl.
*G01C 21/30* (2006.01)
*G01C 21/36* (2006.01)

(52) U.S. Cl.
CPC .................. *G01C 21/3694* (2013.01)

(58) Field of Classification Search
CPC ...... G06Q 10/47; G01C 21/32; G01C 21/26; G01C 21/00; G01C 21/20; G09B 29/106; G08G 1/0969
USPC .................... 701/532, 400, 123; 705/6, 7.11; 707/752, 769, E17.044, E17.014; 340/905
See application file for complete search history.

(56) References Cited

U.S. PATENT DOCUMENTS

| 7,161,502 B2* | 1/2007 | Yamada | G09B 29/106 340/995.1 |
| 7,486,201 B2* | 2/2009 | Kelly | G01C 21/3694 340/905 |
| 7,783,990 B2* | 8/2010 | Amadio | G06F 3/0481 715/781 |
| 8,332,247 B1* | 12/2012 | Bailey | G06Q 10/06375 705/13 |
| 8,442,874 B2* | 5/2013 | Moorhead | G06Q 10/02 705/26.1 |

(Continued)

FOREIGN PATENT DOCUMENTS

| WO | WO 2012/089280 | 7/2012 |
| WO | WO 2013/100915 | 7/2013 |
| WO | WO 2013/144759 | 10/2013 |

OTHER PUBLICATIONS

Best Traffic Apps, http://appadvice.com/appguides/show/best-traffic-apps—1 page.

(Continued)

*Primary Examiner* — Shardul Patel
(74) *Attorney, Agent, or Firm* — Dority & Manning, P.A.

(57) ABSTRACT

Systems and methods for providing an interactive user interface that displays anticipated weather conditions alongside a plurality of available trips between an origin and a destination are provided. An exemplary user interface can include a plurality of trip identifiers on a graph having an axis indicative of time. For example, the plurality of trip identifiers can respectively represent a plurality of available transit trips. For example, each trip identifier can provide an intuitive sense regarding the overall duration of the trip, a number of transfers or legs for each trip, time spent in each leg of the trip, a mode of transportation associated with each leg of each trip, and/or other information. The anticipated weather conditions associated with the trips can be presented alongside the plurality of trip identifiers.

19 Claims, 5 Drawing Sheets

(56) References Cited

U.S. PATENT DOCUMENTS

| | | | | |
|---|---|---|---|---|
| 2008/0125959 A1* | 5/2008 | Doherty | G06F 17/30241 | 701/532 |
| 2009/0216704 A1* | 8/2009 | Zheng | G01C 21/20 | 706/52 |
| 2010/0228574 A1* | 9/2010 | Mundinger | G06Q 10/047 | 705/4 |
| 2010/0305984 A1* | 12/2010 | Ben-Yitschak | G06Q 10/025 | 705/6 |
| 2011/0208417 A1 | 8/2011 | Fink et al. | | |
| 2012/0185793 A1* | 7/2012 | Binsztok | G06Q 10/02 | 715/772 |
| 2013/0325315 A1* | 12/2013 | Beaurepaire | G01C 21/3423 | 701/400 |
| 2014/0330506 A1* | 11/2014 | Ng | G07C 5/085 | 701/123 |
| 2015/0073695 A1* | 3/2015 | Groves | G01W 1/02 | 701/400 |

OTHER PUBLICATIONS

Here Transit, http://www.windowsphone.com/en-us/store/app/here-transit/4ef134ce-9a6e-4667-acbb-b0751a018b35—2 pages.

Massachusetts Bay Transportation Authority. "Online Trip Planning Tools", http://www.mbta.com/rider_tools/app/—6 pages.

Smith, "Nokia Transit Makes the Commute Over fo Asha Touch-screen Phones, Adds Public Transport Info", http://www.engadget.com/2013/03/26/nokia-transit-app-asha-phones-beta/—3 pages.

Yeung, "Mobile-Personal Assistant App Donna Now Has Public Transit Advice, All-Day Events, and More", http://thenextweb.com/apps/2013/08/15/mobile-personal-assistant-app-donna-now-has-public-transit-advice-all-day-events-and-more/#!qICY8—2 pages.

* cited by examiner

INTERACTIVE USER INTERFACE PROVIDING WEATHER INFORMATION AND AVAILABLE TRIPS

FIELD

The present disclosure relates generally to tools for trip planning in view of weather conditions. More particularly, the present disclosure relates to an interactive user interface providing weather information and available trips, such as public transit trips.

BACKGROUND

Research has shown that weather is one of the most common reasons why people deviate from their typical commuting patterns or travel behavior. As an example, when it is raining outside, people tend to take alternative transit trips that reduce the amount of walking required, even if such alternative trips increase the total travel time or fare. For example, a person might choose to take an alternate subway route that involves additional transfers or takes more time, but places her closer to her final destination so as to minimize the amount of time she is required to walk in the rain.

As another example, when it is sunny and pleasant outside, people tend to take alternative transit trips that increase the amount of time spent outside and reduce the amount of time spent travelling on an underground railway or a crowded bus. For example, a person might choose to take an alternative trip that includes more walking or cycling.

As yet another example, when severe weather conditions exist, trips can be delayed or otherwise take longer than usual. Therefore, in the event of such severe weather conditions, a person may choose to take alternative transit trips with earlier departure times so as to compensate for the delays.

Certain existing systems allow users to receive information concerning available transit trips between an origin and a destination. However, such existing systems do not provide weather information. Other existing systems allow users to receive information about current and/or anticipated weather conditions for a given location. However, such other existing systems do not provide information concerning available transit trips.

As such, users are required to access two different sources of information in order to plan their trips in view of weather conditions. Accessing two different sources of information can be cumbersome and time-consuming. For example, the user can be required to load, query, and then switch back and forth between two different webpages in order to receive the desired information.

Further, in instances in which the user desires to see weather and trips associated with several different time frames (e.g. a morning commute, a lunch meeting, and an afternoon commute), multiple interactions are required with each system and the user is continually required to manually confirm that they are appropriately matching weather information to transit trip information over a plurality of different times. This configuration can result in user confusion and frustration.

SUMMARY

Aspects and advantages of the present disclosure will be set forth in part in the following description, or may be obvious from the description, or may be learned through practice of embodiments of the present disclosure.

One example aspect of the present disclosure is directed to a computing system. The computing system includes one or more processors and one or more non-transitory computer-readable media storing instructions that, when executed by the one or more processors, cause the one or more processors to perform operations. The operations include obtaining data describing a plurality of trips between an origin and a destination. Each trip includes one or more legs. Each leg of each trip utilizes one of a plurality of different modes of transportation. The operations include obtaining data describing weather conditions associated with one or more of the plurality of trips. The operations include respectively representing the plurality of trips with a plurality of trip identifiers in a user interface. Each trip identifier comprises one or more portions respectively corresponding to the one or more legs of the trip such trip identifier represents. The operations include providing in the user interface an indication of the mode of transportation associated with each portion of each trip identifier. The operations include displaying the weather conditions associated with one or more of the plurality of trips in the user interface.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Figure 1:
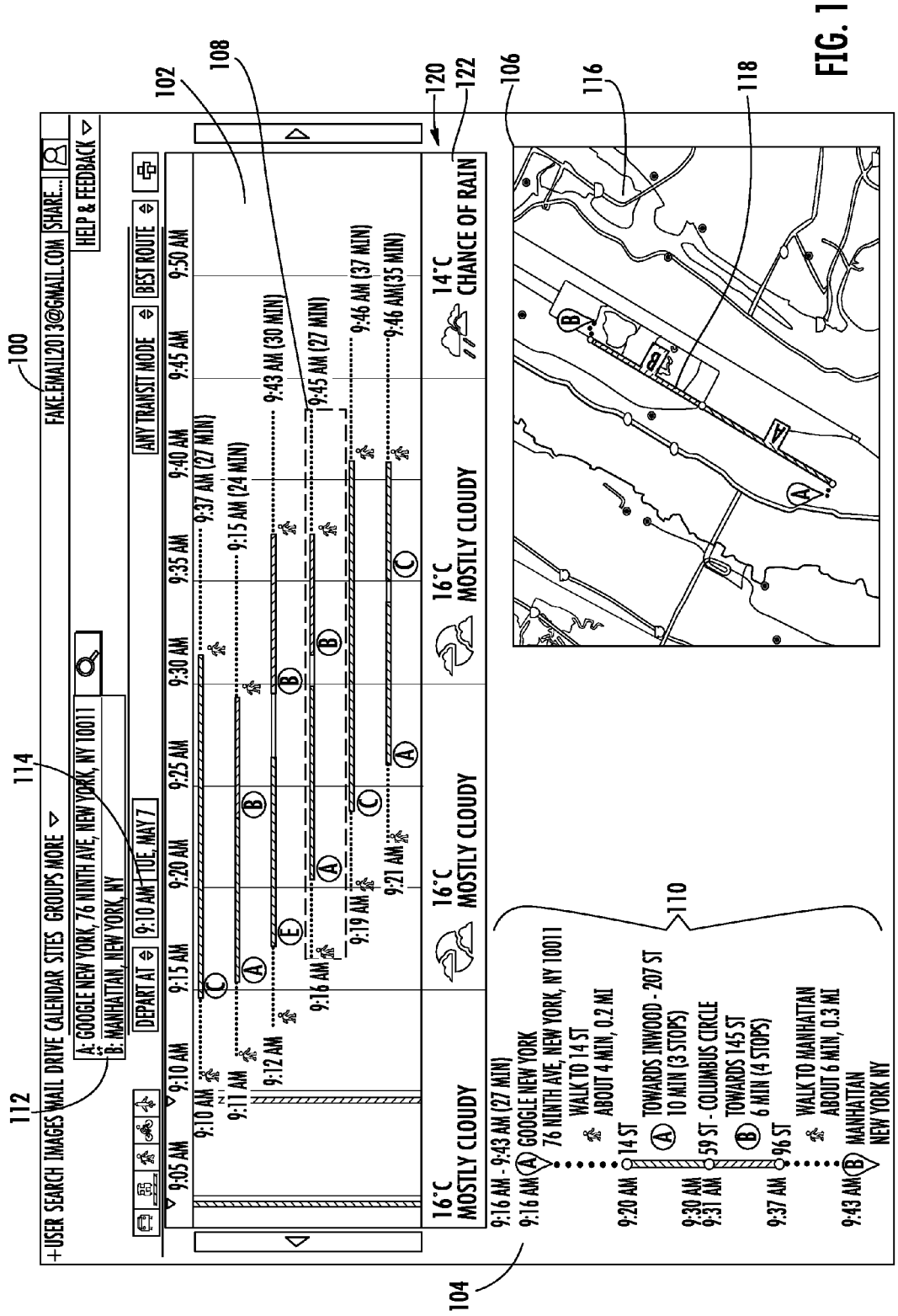
FIG. 1 depicts an example user interface according to an example embodiment of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to systems and methods for providing an interactive user interface that displays anticipated weather conditions alongside a plurality of available trips between an origin and a destination. As an example, a plurality of trip identifiers can be presented on a graph having an axis indicative of time. The plurality of trip identifiers can respectively represent the plurality of available trips and can provide an intuitive illustration of various aspects of the plurality of trips. For example, each trip identifier can provide an intuitive sense regarding the overall duration of the trip, a number of transfers or legs for each trip, time spent in each leg of the trip, a mode of transportation associated with each leg of each trip, and/or other information. The anticipated weather conditions associated with the trips can be presented alongside the plurality of trip identifiers. As an example, a plurality of weather icons can be periodically spaced along the time axis of the graph to indicate the various weather conditions expected for the interval of time depicted by the graph. In such fashion, a user can easily compare the various aspects of the available trips (e.g. durations of various legs of trips having different modes of transportation) in the context of the anticipated weather conditions, so as to select a trip that provides preferred modes of transportation in view of the particular weather conditions for the time of travel.

More particularly, a user can query a mapping application or a geographic information system to request information regarding available trips between an origin and a destination. For example, the user can specify the origin and destination along with a departure time and/or an arrival time.

In response to the user request, the mapping application can identify a plurality of available trips. For example, the available trips can be transit trips (e.g. a combination of one or more publically available modes of transportation such as walking, subways, buses, railways, etc.), driving trips, taxi trips, cycling trips, or other modes of transportation.

In some embodiments of the present disclosure, the available trips can scored and/or filtered based at least in part on their associated weather conditions. For example, if it is raining, then trips that include significant amounts of walking can be penalized or otherwise filtered. As another example, if the weather is sunny and pleasant, then walking or cycling trips can receive a higher score or be presented first or in a more prominent fashion.

Once the appropriate available trips have been identified, the trips can be presented in the user interface. As an example, according to an aspect of the present disclosure, the plurality of trips can be respectively represented by a plurality of trip identifiers provided in a calendar overview portion of the user interface. The calendar overview can include a graph that has units of time on a first axis. In particular, the plurality of trip identifiers can be respectively provided at a plurality of positions of a second axis of the graph. Each trip identifier can extend from a departure time to an arrival time of the trip such trip identifier represents.

Further, each of the plurality of trips can include one or more legs. For example, a transit trip can include a plurality of legs that respectively correspond to discrete instances of transportation using one of a plurality of transit lines or modes of transportation. As another example, a leg of a trip can correspond to required walking from one location to another. Therefore, each trip identifier can include one or more portions that respectively correspond to the one or more legs of the trip such trip identifier represents.

According to another aspect of the present disclosure, each portion of each trip identifier can provide an indication of the mode of transportation used by the leg to which such portion corresponds. In addition, in some implementations, each portion of each trip identifier can have a length that is proportional to the duration of the leg to which such portion corresponds.

According to yet another aspect of the present disclosure, the user interface can further provide an indication of the anticipated weather conditions associated with the provided plurality of trips. For example, in the instance that the user interface includes a graph of the trip identifiers, the weather information can be presented alongside the time axis of the graph.

As an example, a plurality of weather icons can be periodically spaced along the time axis of the graph. Each weather icon can provide an indication of the anticipated weather conditions for the time at which such icon is located. As another example, a temperature curve can be provided along the time axis of the graph. The temperature curve can provide a graphical indication of the temperature conditions associated with each corresponding time along the time axis.

As another example, particular weather conditions associated with one or more of the plurality of trips can be provided in a trip summary or a map portion of the user interface. For example, in some embodiments of the present disclosure, a user can select one of the plurality of trip identifies to receive additional, specific information about the selected trip, such as, for example, a trip summary. The weather conditions associated with the selected trip can be listed alongside the trip summary. Alternatively or additionally, a graphical representation of the weather conditions associated with the selected trip can be superimposed upon a map of the trip. The graphical representation can be a precipitation forecast, a temperature forecast, or other forms of weather information.

As yet another example, in some embodiments of the present disclosure, the user interface can include a weather control that allows the user to select a particular time and receive information concerning anticipated weather conditions for the particular time. For example, the weather control can include a scroll bar that allows the user to scroll through time. Alternatively or additionally, the weather control can include one or more buttons that allow the user to select a day of the week.

Furthermore, various aspects of the user interface can be interactive or otherwise controllable by a user. As an example, the interval of time depicted by the calendar overview can be adjusted by the user. For example, the user can scroll the calendar overview graph with respect to the axis having units of time. Alternatively, the user can specify a particular desired arrival or departure time and graph can be adjusted based upon such desired time.

When the interval of time is adjusted by the user, one or more additional trip identifiers can be provided that represent trips available during the adjusted time interval shown by the calendar overview. Furthermore, the user interface can be updated to reflect anticipated weather conditions associated with the adjusted time interval.

Thus, weather information and transit trips available over an extended period of time can be presented to the user in an interactive user interface. In particular, anticipated weather conditions can be displayed in association with trip identifiers that provide an intuitive sense of trip duration, number and duration of legs, arrival and departure times, and/or modes of transportation used. Therefore, the user can easily explore various aspects of the available trips in the context of the anticipated weather conditions, so as to select a trip that provides preferred modes of transportation in view of the particular weather conditions for the time of travel.

With reference now to the FIGS., example embodiments of the present disclosure will now be discussed in detail. FIG. 1 depicts an example user interface 100 according to an example embodiment of the present disclosure. User interface 100 can be implemented by a computing system or device in order to present weather information in association with available trips between an origin and a destination.

User interface 100 can include a calendar overview 102, a trip summary portion 104, and a map portion 106. Calendar overview 102 can include a plurality of trip identifiers provided on a graph having units of time on an axis. For example, calendar overview 102 includes trip identifier 108.

Trip identifier 108 represents a particular trip available from the origin to the destination. In particular, such trip departs at 9:16 am from the origin and arrives at the destination at 9:43 am. Calendar overviews and trip identifiers will be discussed further with respect to FIG. 2.

In addition, while the trips depicted in user interface 100 are transit trips that include instances of transportation using one or more public transit lines, the present disclosure is not limited to such trips. In particular, as will be discussed further, any suitable trip between an origin and a destination can be provided to the user using user interface 100, including driving trips, walking trips, bicycling trips, trips that includes flights, or any suitable modes of transportation or combinations thereof.

Trip summary portion 104 can include a trip summary 110 that provides additional information concerning one of the available trips. Map portion 106 can depict one or more of the available trips on a map 116. For example, a trip 118 is depicted on map 116.

Map 116 can be generated from a variety of data types, including imagery, tables, vector data (e.g. vector representations of roads, parcels, buildings, etc.) and other data.

A scale or zoom level of map 116 can automatically be adjusted based upon one or more trip geometries respectively associated with one or more trips depicted on map 116. For example, the scale of map 116 or portion of map 116 provided in map portion 106 can automatically be adjusted to display the entirety of the path followed by any depicted trip, including the location of the origin and location of the destination.

According to an aspect of the present disclosure, user interface 100 can further provide weather information associated with the plurality of depicted trips. For example, as shown in FIG. 1, weather information 120 is included in the calendar overview 102.

In some implementations, weather information 120 can include a plurality of weather icons (e.g. weather icon 122) periodically spaced along a time axis of the calendar overview 102. For example, as shown in FIG. 1, weather information 120 includes a weather icon for each fifteen minute time interval shown by calendar overview 102.

Each weather icon can provide an indication of the anticipated weather conditions at the corresponding time designated by its respective location. For example, as indicated by weather icon 122, the anticipated weather conditions for the region of travel from about 9:45 AM to about 10:00 AM are fourteen degrees Celsius with a chance of rain.

Although the weather icons provided by weather information 120 are spaced at fifteen minute intervals, any interval can be used (e.g. 5 minutes, 30 minutes, etc.). Furthermore, in some implementations, separate weather information can be provided for each trip.

In addition, although not depicted in FIG. 1, in some embodiments of the present disclosure, user interface 100 can provide a control that allows the user to select a particular, preferred source of weather information (e.g. one or more third-party weather prognostication services). As another example, in some embodiments, user interface 100 can allow the user to modify or personalize the formatting of weather information 120.

User interface 100 can further include an origin/destination control 112 and a desired arrival/departure time control 114. Controls 112 and 114 can be text entry fields, dialog boxes, toggles providing a plurality of predefined, selectable options, or any other suitable item that provides user control functionality.

For example, origin/destination control 112 can be two text entry fields in which a user can input a desired origin and destination. As shown, the user has requested available trips between origin "Google New York, 76 Ninth Ave, New York, N.Y. 10011" and destination "Manhattan, New York, N.Y." Any suitable origin and destination can be entered by a user of the system.

As an example, desired arrival/departure control 114 can include an arrival/departure toggle, a text entry field, and a calendar-based date selection module. As shown, the user has indicated that she desires to depart the origin at 9:10 am on Tuesday, May 7.

Using the information provided in origin/destination control 112 and desired arrival/departure time control 114, a mapping system can return a plurality of available trips that satisfy the entered information. One or more of the returned plurality of trips can be represented by one or more trip identifiers provided in calendar overview 102.

Figure 2:
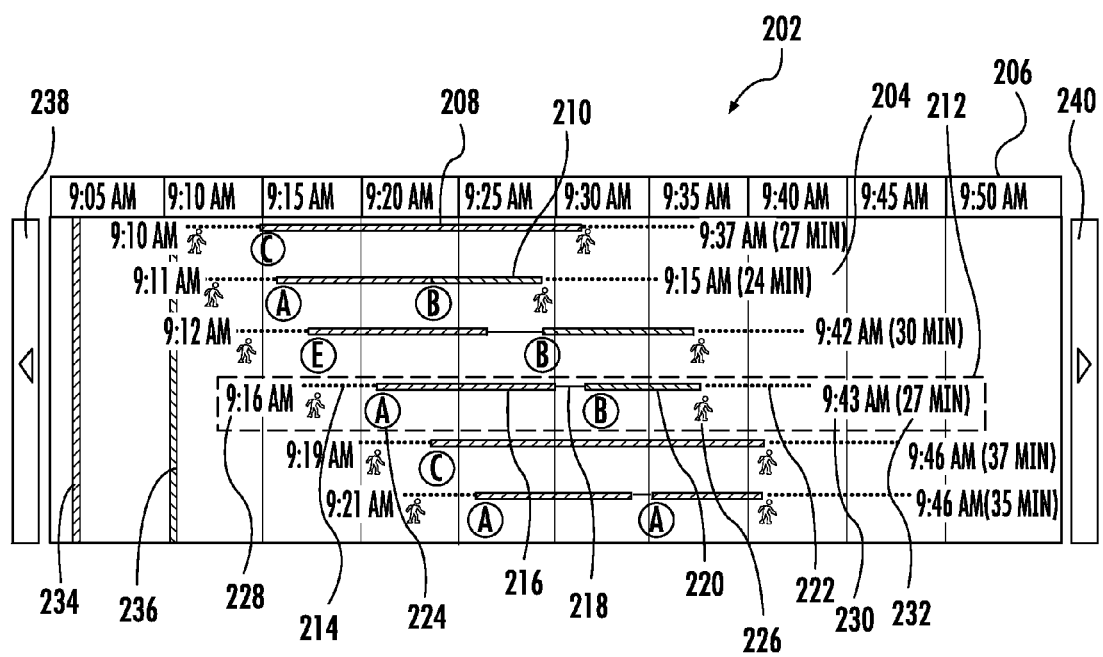
FIG. 2 depicts an example calendar overview according to an example embodiment of the present disclosure.

FIG. 2 depicts an example calendar overview 202 according to an example embodiment of the present disclosure. Calendar overview can include a graph generally 204 that has units of time on an axis 206. Axis 206 can be automatically scaled by a system implementing calendar overview 202 based on the duration of the trips that are to be represented in the calendar overview.

A plurality of trip identifiers can be provided in calendar overview 202, including, for example, trip identifiers 208, 210, and 212. Each trip identifier can represent an available trip between the origin and the destination. For example, trip identifier 208 represents a trip that departs the origin at 9:10 am, arrives at the destination at 9:37 am, and makes use of two walking paths and the "C" subway line.

The plurality of trip identifiers provided in calendar overview 202 can be ordered according to departure time, such that the trip identifier representing the trip having the earliest departure time is provided at the highest position, as shown in FIG. 2. Alternatively, the plurality of trip identifiers can be ordered based on other parameters or can be maintained and presented in an ordering that was provided by the mapping service or other trip identification functionality.

Each of trip identifiers 208, 210, and 212 can include one or more portions which respectively correspond to one or more legs included in the trips trip identifiers 208, 210, and 212 respectively represent. For example, trip identifier 212 can include portions 214, 216, 218, 220, and 222. Each of portions 214-222 can correspond to a leg of the trip represented by trip identifier 212.

As an example, portion 214 of trip identifier 212 can correspond to walking from the origin to $14^{th}$ St. from 9:16 am to 9:20 am. Portion 216 can correspond to taking subway line "A" from $14^{th}$ St. to $59^{th}$ St.-Columbus Circle from 9:20 am to 9:30 am. Portion 218 can correspond to waiting at $59^{th}$ St.-Columbus Circle from 9:30 am to 9:31 am. Portion 220 can correspond to taking subway line "B" from $59^{th}$ St.-

Columbus Circle to 96$^{th}$ St. from 9:31 am to 9:37 am. Portion 222 can correspond to walking from 96$^{th}$ St. to the destination from 9:37 am to 9:43 am.

It will be appreciated that, in some implementations, waiting at a station is not considered an individual leg of a trip. Instead such period of waiting can be incorporated into another leg of the trip or simply be treated as a period of time between legs of the trip.

Each of portions 214-222 can have a length that is generally proportional to the duration of its corresponding leg. In particular, in the instance in which axis 206 provides uniformly spaced units of time, as shown in FIG. 2, portions 214-222 can be directly proportional to the duration of their corresponding legs.

Furthermore, each of portions 214-222 can indicate a mode of transportation utilized by its corresponding leg. For example, portion 216 corresponds to travel using subway line "A". Thus, an icon 224 can be provided with portion 216 which indicates that subway is the mode of transportation. Icon 224 can further indicate the identity of the transit line being employed: "A". As another example, portion 222 corresponds to travel across a walking path. Therefore, an icon 226 can be provided in or along with portion 222 which indicates that walking is the mode of transportation.

Icons 224 and 226 can be stylized or shown according to any suitable size or appearance. In one implementation, icon 224 is designed to resemble the particular symbols used by the transit provider or transit authority such that a user of a system implementing the present disclosure can more easily correlate portion 216 with access to and use of subway line "A".

In other implementations, the mode of transportation associated with each of portions 214-222 can be indicated using a color, a line weight, a line pattern, or other graphical depictions or indications concerning different modes of transportation.

In addition, any other suitable information can be presented in or along with trip identifiers 208, 210, and 212. For example, trip identifier 212 further indicates a trip departure time 228, a trip arrival time 230, and a trip duration 232.

Furthermore, each of portions 214-222 can be depicted using unique and/or identifiable styles so that additional information can be communicated to the user. For example, as shown in FIG. 2, portions 214 and 222 are depicted using a dotted line to represent use of a walking path, while portions 216 and 220 are presented using an unbroken line. Further, one or more colors, patterns, or other stylistic choices can be used to differentiate portions of a trip identifier.

Calendar overview 202 can include further features, such as, for example, a current time indicator 234 and a desired departure time indicator 236. Current time indicator 234 can be any suitable form of indicator that indicates the current time. For example, as shown in FIG. 2, current time indicator can be a bar that is perpendicular to axis 206. The position of current time indicator 234 with respect to axis 206 can be continuously or periodically updated such that it generally reflects the current time of the day.

Desired departure time indicator 236 can indicate the departure time that was entered by the user when the plurality of trips were requested. For example, as shown in FIG. 2, desired departure time indicator 236 can be a bar that is perpendicular to axis 206.

Axis 206 can be automatically scaled by a system implementing calendar overview 202. For example, the scale of axis 206 can be automatically adjusted based on the duration of the trips that are to be represented in the calendar overview. Thus, the most useful information can be displayed across the relevant period of time whether the displayed trips have a relatively long duration or a relatively short duration, Further, in some implementations, gaps or breaks in time can be included in axis 206. A visual indicator can be provided to alert the user that a period of time has been omitted from the graph. As an example, if no trips are available from the origin to the destination between the hours of 2 am and 7 am, then such interval of time can be omitted from the graph and an indicator can be provided. As another example, if all trips displayed have an overlapping period of time in which no change in status occurs (e.g. no useful information to convey), then such overlapping period can be omitted from the graph and an indicator can be provided.

According to another aspect of the present disclosure, the interval of time depicted by calendar overview 202 can be adjusted by a user. For example, as shown in FIG. 2, calendar overview 202 provides trips with departure times and arrival times included in the depicted interval of time, about 9:04 AM to 9:56 AM. However, a user can adjust or otherwise interact with calendar overview 202 such that a different interval of time is depicted or provided by calendar overview 202.

Importantly, when the interval of time provided by calendar overview 202 is adjusted, additional trip identifiers are provided that represent additional trips available during the new interval of time provided by the adjusted calendar overview 202. In such fashion, the best trips available over an extended period of time can be explored using calendar overview 202.

In addition, in the instance in which weather information is provided in association with calendar overview 202, such as, for example, along axis 206, then such weather information can be updated as well when the interval of time is adjusted by a user. In particular, the weather information can be continually updated to provide anticipated weather conditions associated with whatever interval of time is depicted by calendar overview 202.

As an example, a user can select a left paddle 238 to adjust the interval of time provided by calendar overview 202 to an earlier time. For example, by clicking on or pressing on left paddle 238, calendar overview 202 can be adjusted by a predefined amount, such as, for example, thirty minutes. Similarly, a user can select a right paddle 240 to adjust the interval of time provided by calendar overview 202 to a later time. For example, after clicking or pressing right paddle 240, the interval of time provided by calendar overview 202 can be shifted thirty minutes forward (e.g. from 9:04 am-9:56 am to 9:34 am-10:26 am.

Other controls can be provided to interact with calendar overview 202 as well. As an example, a user can click or press, hold, and drag axis 206 left or right in order to adjust the interval of time provided by calendar overview 202. For example, selecting, holding, and dragging axis 206 to the right can cause graph 204 to be negatively scrolled with respect to axis 206 (e.g. move the depicted interval of time to the right such that an earlier interval of time is provided). Likewise, selecting, holding, and dragging axis 206 to the left can cause graph 204 to be positively scrolled with respect to axis 206 (move the depicted interval of time to the left such that a later interval of time is provided). As another example, graph 204 can be scrolled by hovering a cursor over graph area 204 and operating a scroll wheel.

As yet another example, in one implementation, clicking, holding, and dragging graph area 204 to the right or left can adjust the interval of time shown. In another implementation which employs a touch-sensitive display, pressing, holding, and dragging graph area 204 to the right or left with two touch-items (e.g. fingers) can allow a user to adjust the interval of time shown.

It will be appreciated that the control methods provided herein are example in nature. Thus, alternative control methods can be used in satisfaction of the present disclosure, including controls which incorporate a flicking motion, pinching motions, tapping, double-tapping, two-item rotation, or other suitable controls. As an example, in one implementation, the scale of axis 206 can be adjusted using pinching motions on graph area 204 or by selecting, holding, and dragging axis 206 itself.

According to an aspect of the present disclosure, when the interval of time provided by calendar overview 202 is adjusted by a user, the trip identifiers provided in calendar overview 202 can be moved correspondingly. For example, when graph 204 is positively scrolled with respect to axis 206 (e.g. scrolled so that later times are shown), the trip identifiers can be moved upwards and to the left until they are respectively removed from the field of view. In such fashion, the user is given an intuitive visual sense that she is moving on to a later time and that the shown trip identifiers are receding in accordance with the earlier time of their corresponding trips.

Similarly, when graph 204 is negatively scrolled with respect to axis 206 (e.g. scrolled so that earlier times are shown), the trip identifiers can be moved downwards and to the right until they are respectively removed from the field of view. In such fashion, the user is given an intuitive visual sense that she is moving back to an earlier time and that the shown trip identifiers are proceeding in accordance with the later time of their corresponding trip.

Likewise, in the instance in which weather information is provided in association with calendar overview 202, such as, for example, along axis 206, then the weather information can be moved in a corresponding fashion when the interval of time provided by calendar overview 202 is adjusted by a user.

For example, when graph 204 is positively scrolled with respect to axis 206 (e.g. scrolled so that later times are shown), the weather information (e.g. weather icons provided at periodic intervals along axis 206) can be moved leftwards in a corresponding fashion until particular time-specific information disappears from the calendar overview 202 and is replaced with new information specific to the new interval of time.

Likewise, when graph 204 is negatively scrolled with respect to axis 206 (e.g. scrolled so that earlier times are shown), the weather information can be moved rightwards in a corresponding fashion until particular time-specific information disappears from the calendar overview 202 and is replaced with new information specific to the new interval of time.

According to yet another aspect of the present disclosure, each of the trip identifiers provided in calendar overview 202, including trip identifiers 208, 210, and 212, can be capable of being selected by a user. For example, when a trip identifier is selected, all other trip identifiers can be presented in a faded fashion.

Figure 3:
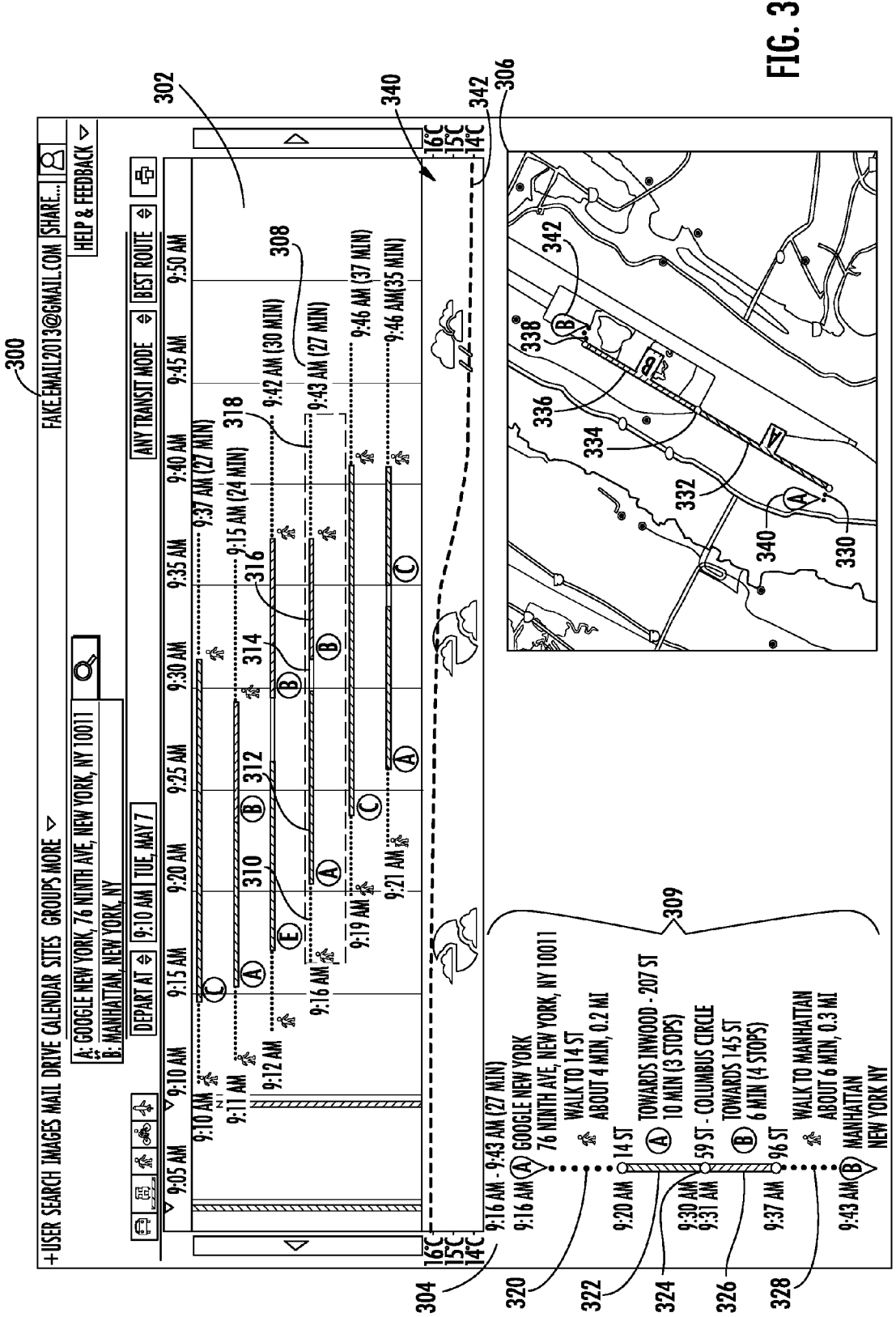
FIG. 3 depicts an example user interface according to an example embodiment of the present disclosure.

When a trip identifier is selected by a user, additional information concerning the trip represented by the selected trip identifier can be provided to the user. For example, FIG. 3 depicts an example user interface 300 according to an example embodiment of the present disclosure. User interface 300 includes a calendar overview 302, a trip summary portion 304, and a map portion 306.

In addition, user interface 300 can provide weather information 340 associated with the trips depicted in calendar portion 302. In particular, weather information 340 includes a temperature curve 342. Temperature curve 342 can provide a graphical indication of the temperature conditions associated with the corresponding times indicated by the time axis of calendar portion 302. One or more weather icons can optionally be presented in association with temperature curve 342. As other examples, weather information 340 can include a precipitation curve that graphically indicates expected precipitation volume or percentage chance of precipitation versus time.

As shown in FIG. 3, a trip identifier 308 has been selected by a user. Trip identifier 308 includes portions 310, 312, 314, 316, and 318.

Responsive to the user selection of trip identifier 308, trip summary portion 304 can include a trip summary 309 that provides additional information about each leg of the trip represented by trip identifier 308. For example, trip summary 309 can include descriptions 320-328 which respectively correspond to portions 310-318. Each of descriptions 320-328 can describe a corresponding leg of the selected trip by providing information including, but not limited to, a leg departure time, a leg arrival time, a leg origin, a leg destination, a leg duration, a leg distance, a leg mode of transportation, or any other suitable information, such as particular transit line, vehicle, or transit provider used, or number of stops traversed.

Further in response to the user selection of trip identifier 308, the trip represented by trip identifier 308 can be depicted on map portion 306. In particular, each of the legs of such trip can be individually depicted using a variety of colors, patterns, indicators, icons, shadings, text, and/or other suitable identifiers. For example, the depicted trip includes depicted legs 330-338, depicted origin 340 and depicted destination 342.

In addition, one or more overlays can be provided on one or more of calendar overview 302, trip summary 309, or map portion 306. For example, a traffic overlay can be provided. The traffic overlay can depict current traffic conditions using various colors or patterns. The traffic overlay can also describe any delays being experienced by one or more of the transit lines employed by the selected trip. For example, if portion 312 of trip identifier 308 corresponds to use of subway line "A," and subway line "A" is experiencing delays, then one or more of portion 312, leg description 322, and depicted leg 332 can be shown, depicted, or provided with an alternate rendering such that a user can ascertain that subway line "A" is currently experiencing delays.

As another example, according to an aspect of the present disclosure, a graphical representation of the weather conditions associated with the selected trip can be overlayed upon map portion 306. The graphical representation can be a precipitation forecast, a temperature forecast, or other forms of weather information such as, for example, severe weather alerts. The graphical representation can include various colors, shadings, icons, text, or other elements to provide a graphical representation of the anticipated weather conditions.

As yet another example, one or more notifications can be provided on one or more of calendar overview 302, trip summary 309, or map portion 306. For example, if subway line "A" is experiencing delays, then one or more of portion 312, leg description 322, and depicted leg 332 can include or be accompanied by a notification. For example, the notification can be an illustrated exclamation mark that provides additional text information when selected by the user or hovered over using a cursor.

Other example overlays include a transit service outage overlay, road construction overlay, road closure overlay, an elevation overlay for bicycling routes, or any other suitable overlay or user-selectable combinations thereof.

Furthermore, although a single trip identifier 308 is shown as selected in FIG. 3 and, therefore, only a single trip summary 309 is provided and a single trip depicted in map portion 306, the present disclosure is not limited to such functionality. In particular, in one implementation, two or more trip identifiers can be selected at the same time. As a result, two or more trip summaries can be provided in trip summary portion 304 and two or more trips can be depicted in map portion 306. In such fashion, a user can compare two or more available trips in various formats.

Figure 4:
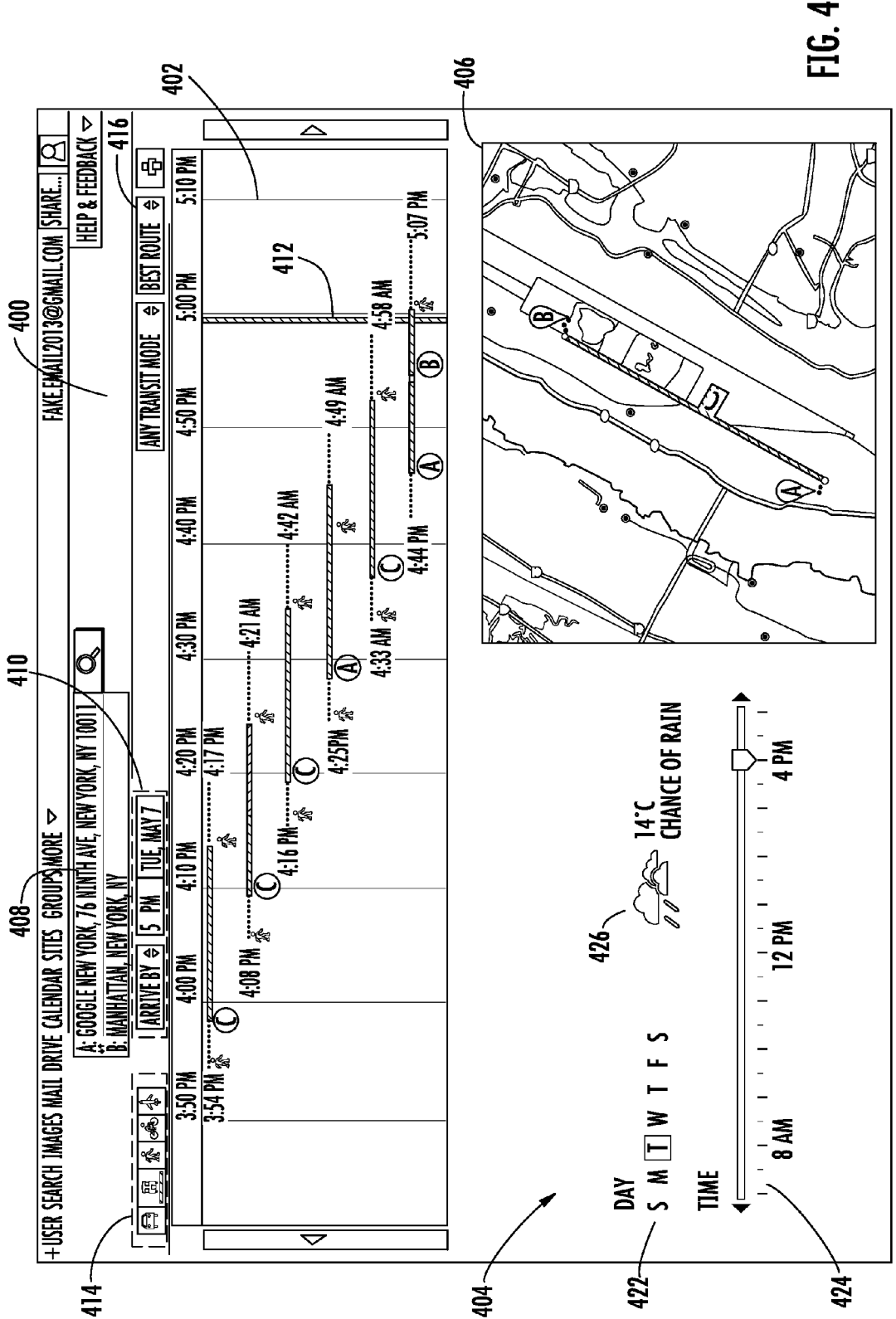
FIG. 4 depicts an example user interface according to an example embodiment of the present disclosure.

FIG. 4 depicts an example user interface 400 according to an example embodiment of the present disclosure. User interface 400 includes a calendar overview 402, a weather control 404, and a map portion 406.

Weather control 404 can be interactive and can allow the user to select a particular time and receive information concerning anticipated weather conditions for the particular time. For example, weather control 404 can include one or more buttons 422 that allow the user to select a day of the week. In addition, weather control 404 can include a scroll bar 424 that allows the user to scroll through time.

Once the user has selected a particular time, weather information, such as, for example, weather icon 426, can be provided. The provided weather information can describe anticipated weather conditions associated with the day and time combination selected by the user. Thus, in some implementations, the user can be provided with the ability to separately explore weather conditions and available trips for different times within the same user interface.

User interface 400 can also include an origin/destination control 408 and a desired arrival/departure time control 410. Controls 112 and 114 can be text entry fields, dialog boxes, toggles providing a plurality of predefined selectable options, or any other suitable item that provides user control functionality.

In particular, as shown in FIG. 4, the user has entered a desired origin and destination into origin/destination control 408 and requested trips that arrive by 5 pm on Tuesday, May 7$^{th}$ using desired arrival/departure control 410. As a result, a plurality of trip identifiers are provided in calendar overview 402 that represent available trips between the provided origin and destination that arrive generally at, before, or around the provided desired arrival time. Further, a desired arrival time indicator 412 is provided in calendar overview 402 which indicates the desired arrival time with respect to the provided trip identifiers. For example, desired arrival time indicator 412 is shown in FIG. 4 as a vertical bar at 5:00 pm.

Other controls provided by user interface 400 include transportation class selection buttons 414 and trip preference toggles 416. Example transportation classes include driving, transit, walking, bicycling, flying, or other suitable transportation classes. The transit transportation class can include trips which use rail lines, bus lines, tram lines, ferry lines, trains, or any other suitable form of transit transportation.

Transportation class selection buttons 414 can allow a user to filter all available trips between the origin and the destination based on transportation class. Alternatively, transportation class selection buttons can be used to request trips using a particular transportation class from the mapping service or trip identification functionality.

In some implementations, if the user has not previously actively selected a transportation class via buttons 414, then the initial transportation class of trips returned in response to a search query can be dependent upon or influenced by the particular weather conditions associated with the time and location of travel. For example, if it is sunny and pleasant outside and the user has not specified a desired transportation class, then the systems of the present disclosure may first provide the user with available walking or bicycling trips in response to their query. Likewise, poor weather conditions may result in driving class or transit class trips being provided initially.

In some implementations, only a single one of the transportation class selection buttons 414 can be selected at a single time. Thus, as shown in FIG. 4, if the transit class button is selected, then only trip identifiers that represent available transit trips will be provided in calendar overview 402. In other implementations, two or more of the transportation class selection buttons 414 can be selected at the same time, such that trip identifiers that represent a mix of trips that use any of the selected transportation classes can be provided in calendar overview 402.

Trip preference toggles 416 can be used by a user to provide additional information about trip preferences. For example, a user can provide additional information about a preferred vehicle type by selecting from among the options: "Any transit mode;" "Bus;" "Subway;" "Train;" "Tram/Light Rail;" or any other suitable vehicle type option, including, for example, "Taxi." As another example, a user can provide additional information about preferred route types by selecting from among the options: "Best route;" "Fewer transfers;" "Less walking;" or any other suitable route type, including, for example, "Wheelchair accessible."

Figure 5:
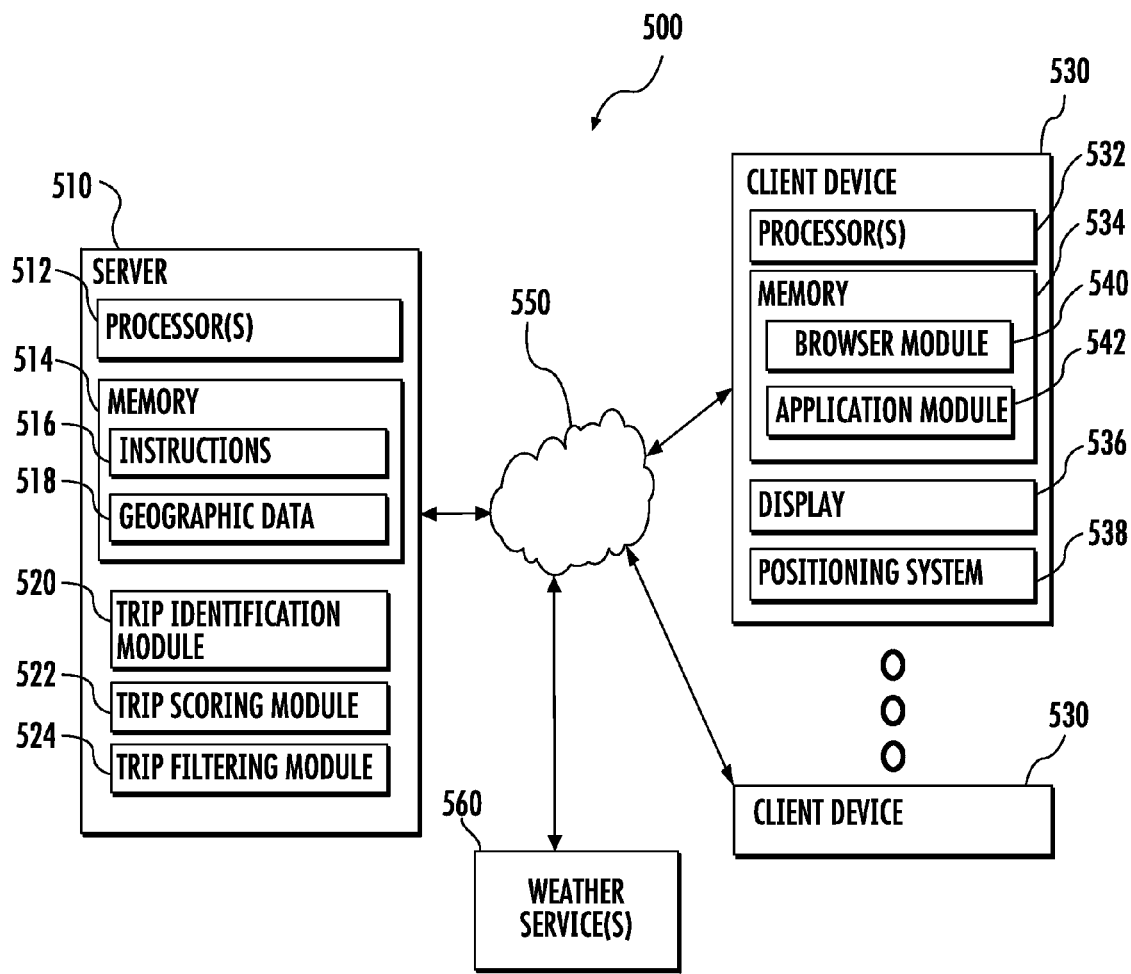
FIG. 5 depicts an example computing system according to an example embodiment of the present disclosure.

FIG. 5 depicts an example computing system 500 that can be used to implement the interactive user interface for providing weather information and available trips according to an example embodiment of the present disclosure. The system 500 is a client-server architecture that includes a server 510 that communicates with one or more client devices 530 over a network 550. The system 500 can be implemented using other suitable architectures, such as a single computing device.

The system 500 includes a server 510, such as a web server. Server 510 can be implemented using one or more computing devices. When server 510 is implemented using a plurality of computing devices, such computing devices can be organized into a distributed computing system or a parallel computing system.

The server 510 can have one or more processor(s) 512 and a memory 514. The server 510 can also include a network interface used to communicate with one or more remote computing devices (e.g. client devices) 530 over a network 550.

The processor(s) 512 can be any suitable processing device, such as a microprocessor, microcontroller, integrated circuit, or other suitable processing device. The memory 514 can include any suitable computing system or media, including, but not limited to, non-transitory computer-readable media, RAM, ROM, hard drives, flash drives, or other memory devices. The memory 514 can store information accessible by processor(s) 512, including instructions 516 that can be executed by processor(s) 512. The instructions 516 can be any set of instructions that when executed by the processor(s) 512, cause the processor(s) 512 to provide desired functionality.

Server 510 can further include a trip identification module 520, a trip scoring module 522, and a trip filtering module 524.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Server 510 can implement trip identification module 520 to identify one or more trips in response to a user query. For example, trip identification module 520 can be implemented to perform one or more search algorithms with respect to data describing available trips between an origin and a destination.

Server 510 can implement trip scoring module 522 to provide a score for each trip identified by trip identification module 520. For example, trip scoring module 522 can be implemented to determine and provide a score for a plurality of trips based on any number of parameters, including user-provided preferences or criteria.

In some embodiments of the present disclosure, trip scoring module 522 can be implemented to determine and provide a score for each of the plurality of trips based at least in part on the associated weather conditions. For example, if it is raining, then trips that include significant amounts of walking can be penalized or otherwise receive a lower score. As another example, if the weather is sunny and pleasant, then walking or cycling trips can receive a higher score Thus, in addition to providing the user with access to weather information, the systems and methods of the present disclosure can also assist in automatically selecting or identifying trips providing preferred modes of transportation in view of the particular weather conditions for the time of travel.

Server 510 can implement trip filtering module 524 to filter or order identified trips. For example, trip filtering module can be implemented to filter trips based on the respective scores determined by trip scoring module 522 or based on other parameters. In some implementations, trip filtering module 524 can filter trips based at least in part on weather data and mode of transportation data associated with various trips.

Memory 514 can also include data 518, such as geographic data, that can be retrieved, manipulated, created, or stored by processor(s) 512. The data 518 can be stored in one or more databases. The one or more databases can be connected to the server 510 by a high bandwidth LAN or WAN, or can also be connected to server 510 through network 550. The one or more databases can be split up so that they are located in multiple locales.

The server 510 can exchange data with one or more weather services 560. For example, server 510 can send a request to weather service(s) 560 that specifies a given location and time. In response to the request, weather service(s) 560 can provide data describing anticipated, current, or historical weather conditions for the date, time, and location. For example, server 510 can access weather service(s) 560 using an application programming interface.

In some implementations, weather service 560 can be internal to or included in server 510. In other implementations, server 510 can aggregate weather information from multiple third-party weather services 560.

The server 510 can also exchange data with one or more client devices 530 over the network 550. Although two client devices 530 are illustrated in FIG. 10, any number of client devices 530 can be connected to the server 510 over the network 550. The client devices 530 can be any suitable type of computing device, such as a general purpose computer, special purpose computer, laptop, desktop, integrated circuit, mobile device, smartphone, tablet, wearable computing device, or other suitable computing device.

Similar to server 510, a client device 530 can include a processor(s) 532 and a memory 534. The memory 534 can store information accessible by processor(s) 532, including instructions that can be executed by processor(s) and data. As an example, memory 534 can store a browser module 540 and an application module 542.

Browser module 540 can provide instructions for implementing a browser. In particular, the user of client device 530 can exchange data with server 510 by using the browser to visit a website accessible at a particular web-address. The user interfaces of the present disclosure can be provided as an interface of the website.

Application module 542 can provide instructions for running a specialized application on client device 530. In particular, the specialized application can be used to exchange data with server 510 over the network 550. Application module 542 can include client-device-readable code for providing and operating the user interfaces of the present disclosure.

The client device 530 can include various input/output devices for providing and receiving information from a user, such as, for example, a touch screen, touch pad, data entry keys, speakers, mouse, and/or a microphone suitable for voice recognition. For instance, the client device 530 can have a display 536 for presenting information, such as the user interface of the present disclosure.

The client device 530 can also include a positioning system 538 that can be used to identify the position of the client device 530. The positioning system 538 can be optionally used by the user to monitor the user's position relative to a transit route. The positioning system 538 can be any device or circuitry for monitoring the position of the client device 530. For example, the positioning device 538 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

In some embodiments, in order to obtain the benefits of the techniques described herein, the user may have to allow the use of information such as the user's current location or allow storage of preferences selected by the user. If the user does not allow use of such information, then the user may not receive the benefits of the techniques described herein. Further, in some embodiments in which the systems and method discussed herein utilize information about users or user devices, the users may be provided with an opportunity to control whether programs or features collect or utilize such information. In addition, in various embodiments, certain information or data can be treated in or more ways before it is stored or used, so that personally identifiable information is removed.

The network 550 can be any type of communications network, such as a local area network (e.g. intranet), wide area network (e.g. Internet), or some combination thereof. The network 550 can also include a direct connection between a client device 530 and the server 510. In general, communication between the server 510 and a client device 530 can be carried via network interface using any type of wired and/or wireless connection, using a variety of communication protocols (e.g. TCP/IP, HTTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system comprising one or more processors and one or more memory devices, the one or more memory devices storing computer-readable instructions that, when executed by the one or more processors, cause the one or more processors to perform operations, the operations comprising:
    obtaining data describing a plurality of trips between an origin and a destination, wherein each trip comprises one or more legs, and wherein each leg of each trip utilizes one of a plurality of different modes of transportation;
    obtaining data describing weather conditions associated with one or more of the plurality of trips, the weather conditions being further associated with one or more time periods during which the weather conditions are expected to occur;
    identifying one or more modes of transportation from the plurality of different modes of transportation to be presented to a user, the one or more modes of transportation being identified based at least in part on the data describing the weather conditions;
    respectively representing at least a subset of the plurality of trips with a plurality of trip identifiers in a user interface, wherein each trip identifier comprises one or more portions respectively corresponding to the one or more legs of the trip such trip identifier represents, each trip identifier in the at least a subset being associated with one of the one or more modes of transportation, each trip identifier being further associated with at least one of the one or more time periods during which the weather conditions are expected to occur;
    providing in the user interface an indication or the mode of transportation associated with each portion of each trip identifier in the at least a subset; and
    displaying the weather conditions associated with one or more of the at least a subset of the plurality of trips in the user interface.

2. The computing system of claim 1, wherein the plurality of trips comprise a plurality of transit trips using the plurality of different modes of transportation, and wherein the plurality of different modes of transportation comprise a walking mode and at least one public transportation mode.

3. The computing system of claim 1, wherein respectively representing the plurality of trips with a plurality of trip identifiers in the user interface comprises respectively representing the plurality of trips with the plurality of trip identifiers on a graph included in the user interface, wherein the graph has units of time on a first axis.

4. The computing system of claim 3, wherein displaying the weather conditions associated with one or more of the plurality of trips in the user interface comprises displaying the weather conditions along the first axis of the graph.

5. The computing system of claim 4, wherein displaying the weather conditions along the first axis of the graph comprises displaying a plurality of weather icons spaced at intervals along the first axis of the graph, wherein each of the plurality of weather icons provides an indication of the weather conditions associated with the corresponding time indicated at its position on the first axis.

6. The computing system of claim 4, wherein displaying the weather conditions along the first axis of the graph comprises displaying a temperature curve along the first axis of the graph, wherein the temperature curve provides an indication of temperature conditions associated with the corresponding times indicated by the first axis.

7. The computing system of claim 3, wherein:
    each leg of each trip has a duration; and
    each portion of each trip identifier has a length that is proportional to the duration of the leg to which such portion corresponds.

8. The computing system of claim 3, wherein the user can adjust an interval of time depicted by the graph by scrolling the graph with respect to the first axis.

9. The computing system of claim 8, wherein the one or more non-transitory computer-readable media store further instructions that, when executed by the one or more processors, cause the one or more processors to perform further operations, the further operations comprising:
    when the user adjusts the interval of time depicted by the graph, obtaining data describing weather conditions associated with the adjusted interval of time; and
    displaying in the user interface the weather conditions associated with the adjusted interval of time.

10. The computing system of claim 1, wherein the one or more non-transitory computer-readable media store further instructions that, when executed by the one or more processors, cause the one or more processors to perform further operations, the further operations comprising:
    receiving a user selection of one of the plurality of trip identifiers;
    displaying the trip represented by the selected trip identifier on a map; and
    depicting on the map one or more weather conditions associated with the displayed trip.

11. The computing system of claim 1, wherein displaying the weather conditions associated with one or more of the plurality of trips in the user interface comprises providing in the user interface a weather control that allows a user to select a time and receive additional weather information concerning anticipated weather conditions at the selected time.

12. The computing system of claim 11, wherein the weather control comprises a scroll bar allowing the user to scroll through the hours of the day.

13. A computer-implemented method for presenting weather information in associated with available trips, the method comprising: determining, by one or more computing devices, a plurality of public transits trips from an origin to a destination, wherein each of the plurality of public transit trips has a departure time and an arrival time included in an interval of time; obtaining, by the one or more computing devices, weather information describing anticipated weather conditions associated with one or more time periods over the interval of time; identifying, by the one or more computing devices, at least one mode of transportation, the at least one mode of transportation being identified based at least in part on the weather information; representing, by one or more computing devices, at least a subset of the plurality of public transit trips with one or more trip identifiers on a graph depicting the interval of time, wherein each trip identifier indicates one of the at least one mode of transportation associated with the public transit trip such trip identifier represents, the one or more trip identifiers being associated with at least one of the one or more time periods over the interval of time; and displaying, by the one or more computing devices, the anticipated weather conditions in associated with the graph.

14. The method of claim 13, further comprising, prior to representing, by the one or more computing devices, one or more of the plurality of public transit trips with one or more trip identifiers on the graph depicting the interval of time:
determining, by the one or more computing devices, one or more modes of public transportation for each of the plurality of public transit trips; and
selecting, by the one or more computing devices, the one or more of the plurality of public transit trips for representation on the graph based at least in part on the weather information and the one or more modes of public transportation associated with each of the plurality of public transit trips.

15. The method of claim 13, wherein displaying, by the one or more computing devices, the anticipated weather conditions in association with the graph comprises displaying, by the one or more computing devices, the anticipated weather conditions along a timeline associated with the graph.

16. One or more tangible, non-transitory computer-readable media storing computer-readable instructions that when executed by one or more processors cause the one or more processors to perform operations, the operations comprising:
receiving data describing a plurality of trips between an origin and a destination, the data being responsive to a user request;
providing to the user on a display of the device an interactive user interface for exploring the plurality of trips;
wherein the interactive user interface comprises a calendar overview tool depicting at least a subset of the plurality of trips across an interval of time, the at least a subset being determined based at least in part on a score associated with each of the plurality of trips, the score being determined for each of the plurality of trips based at least in part on one or more modes of transportation utilized in the trip in view of weather information associated with the interval of time, and wherein the score of at least one trip of the plurality of trips is penalized based at least in part on the weather information associated with the interval of time;
wherein the interactive user interface indicates the one or more modes of transportation associated with each of the at least a subset of the plurality of trips based at least in part on the weather information and one or more time periods during the interval of time; and
wherein the interactive user interface provides the weather information associated with the interval of time.

17. The device of claim 16, wherein the interactive user interface provides weather information associated with the interval of time by providing a plurality of weather icons across the interval of time depicted by the calendar overview tool, and wherein each of the plurality of weather icons provide an indication of anticipated weather conditions at a time contained within the interval of time.

18. The device of claim 16, wherein the interactive user interface provides weather information associated with the interval of time by providing weather information along a timeline included in the calendar overview tool.

19. The device of claim 16, wherein the interactive user interface provides weather information associated with the interval of time by providing an interactive weather control, and wherein the interactive weather control allows the user to select a particular time and receive anticipated weather conditions for the particular time.

* * * * *